United States Patent
Kumar et al.

(10) Patent No.: US 11,347,561 B1
(45) Date of Patent: May 31, 2022

(54) CORE TO RESOURCE MAPPING AND RESOURCE TO CORE MAPPING

(71) Applicant: VMware, Inc., Palo Alto, CA (US)

(72) Inventors: Raju Kumar, San Jose, CA (US); Sreeram Iyer, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 375 days.

(21) Appl. No.: 16/016,360

(22) Filed: Jun. 22, 2018

Related U.S. Application Data (60) Provisional application No. 62/664,781, filed on Apr. 30, 2018.

(51) Int. Cl.
   *G06F 9/50* (2006.01)
   *H04L 67/1008* (2022.01)

(52) U.S. Cl.
   CPC ............ *G06F 9/5077* (2013.01); *G06F 9/505* (2013.01); *G06F 9/5044* (2013.01); *G06F 9/5083* (2013.01); *H04L 67/1008* (2013.01); *G06F 2209/503* (2013.01)

(58) Field of Classification Search
   None
   See application file for complete search history.

(56) References Cited

U.S. PATENT DOCUMENTS

| | | | |
|---|---|---|---|
| 6,968,441 B1 * | 11/2005 | Schnee | G06F 9/5016 711/173 |
| 7,003,118 B1 | 2/2006 | Yang et al. | |
| 7,243,225 B2 | 7/2007 | Poeluev et al. | |
| 7,555,544 B1 * | 6/2009 | Rattner | H04L 67/10 709/201 |
| 7,814,310 B2 | 10/2010 | Bouchard et al. | |
| 7,962,358 B1 * | 6/2011 | Fernandez | G06Q 10/06 705/7.23 |
| 9,483,286 B2 | 11/2016 | Basavaiah | |
| 9,535,750 B1 * | 1/2017 | Wilkes | G06F 9/4881 |
| 9,588,813 B1 * | 3/2017 | Dubey | G06F 11/3409 |
| 9,755,972 B1 | 9/2017 | Mao et al. | |
| 9,929,970 B1 * | 3/2018 | Matthews | H04L 43/0817 |
| 10,020,984 B1 | 7/2018 | Jork et al. | |
| 10,257,167 B1 | 4/2019 | Matthews et al. | |

(Continued)

FOREIGN PATENT DOCUMENTS

| CN | 102801695 A | 11/2012 |
|---|---|---|

OTHER PUBLICATIONS

Non-Published Commonly Owned U.S. Appl. No. 16/893,450, filed Jun. 5, 2020, 33 pages, VMware, Inc.

(Continued)

*Primary Examiner* — Meng Ai T An
*Assistant Examiner* — Zujia Xu
(74) *Attorney, Agent, or Firm* — Adeli LLP (57) ABSTRACT

Core to resource and resource to core mapping is disclosed. In an embodiment, a method includes obtaining an input pattern including a plurality of resource identifiers corresponding to resources. The method further includes applying the input pattern to a guaranteed regular and uniform distribution process to obtain a distribution pattern that indicates a distribution of resources across cores or a distribution of the cores across the resources. The method further includes distributing the resources across the cores or distributing the cores across the resources according to the distribution pattern.

18 Claims, 8 Drawing Sheets

(56) References Cited

U.S. PATENT DOCUMENTS

| | | | |
|---|---|---|---|
| 10,498,708 B2 | 12/2019 | Wang et al. | |
| 10,623,372 B2 | 4/2020 | Wang et al. | |
| 10,701,107 B2 | 6/2020 | Gopal et al. | |
| 11,075,888 B2 | 7/2021 | Jain et al. | |
| 11,095,617 B2 | 8/2021 | Jain et al. | |
| 2002/0097724 A1 | 7/2002 | Halme et al. | |
| 2003/0088787 A1 | 5/2003 | Egevang | |
| 2004/0143734 A1 | 7/2004 | Buer et al. | |
| 2005/0198531 A1 | 9/2005 | Kaniz et al. | |
| 2005/0213603 A1 | 9/2005 | Karighattam et al. | |
| 2006/0002388 A1 | 1/2006 | Grebus et al. | |
| 2008/0123593 A1* | 5/2008 | Fujita | H04W 72/044 370/330 |
| 2008/0144625 A1 | 6/2008 | Wu et al. | |
| 2008/0165964 A1 | 7/2008 | Lewis et al. | |
| 2008/0307024 A1* | 12/2008 | Michaels | G06F 7/58 708/250 |
| 2010/0191958 A1 | 7/2010 | Chen | |
| 2010/0217949 A1* | 8/2010 | Schopp | G06F 9/5077 711/173 |
| 2011/0113236 A1 | 5/2011 | Chenard et al. | |
| 2012/0027314 A1* | 2/2012 | Lee | H04N 19/593 382/233 |
| 2012/0102278 A1* | 4/2012 | Joffray | G06Q 20/3576 711/155 |
| 2012/0124591 A1* | 5/2012 | Cadambi | G06F 9/505 718/103 |
| 2012/0170459 A1* | 7/2012 | Olesinski | H04L 47/623 370/235 |
| 2014/0089480 A1* | 3/2014 | Zhu | G06Q 10/06 709/223 |
| 2014/0108665 A1 | 4/2014 | Arora et al. | |
| 2014/0313932 A1 | 10/2014 | Saltsidis | |
| 2015/0052525 A1 | 2/2015 | Raghu | |
| 2015/0195138 A1* | 7/2015 | Horman | H04L 43/08 709/226 |
| 2016/0057108 A1 | 2/2016 | Hu | |
| 2016/0088072 A1* | 3/2016 | Likhtarov | H04L 67/1008 709/226 |
| 2016/0182509 A1 | 6/2016 | Kantecki et al. | |
| 2016/0212098 A1 | 7/2016 | Roch | |
| 2016/0226815 A1 | 8/2016 | Wan et al. | |
| 2016/0277478 A1 | 9/2016 | Narasimhamurthy | |
| 2016/0352628 A1 | 12/2016 | Reddy et al. | |
| 2017/0024293 A1* | 1/2017 | Bell | G06F 11/3495 |
| 2017/0054603 A1* | 2/2017 | Kulkarni | H04L 41/0893 |
| 2017/0063979 A1 | 3/2017 | Saeki | |
| 2017/0374025 A1 | 12/2017 | Pan | |
| 2018/0054458 A1 | 2/2018 | Marek et al. | |
| 2018/0067786 A1* | 3/2018 | Nguyen Trung | G06F 16/951 |
| 2018/0131521 A1 | 5/2018 | Yang et al. | |
| 2018/0241655 A1 | 8/2018 | Tsirkin | |
| 2019/0114206 A1* | 4/2019 | Murugesan | G06F 9/5061 |
| 2019/0173850 A1 | 6/2019 | Jain et al. | |
| 2019/0173851 A1 | 6/2019 | Jain et al. | |
| 2019/0190892 A1 | 6/2019 | Menachem et al. | |
| 2019/0266217 A1* | 8/2019 | Arakawa | G06F 9/30036 |
| 2020/0351254 A1 | 11/2020 | Xiong et al. | |
| 2020/0403922 A1 | 12/2020 | Yu et al. | |
| 2021/0021523 A1 | 1/2021 | Wang et al. | |
| 2021/0136049 A1 | 5/2021 | Wang et al. | |

OTHER PUBLICATIONS

Non-Published Commonly Owned U.S. Appl. No. 17/016,596, filed Sep. 10, 2020, 36 pages, VMware, Inc.

Kim, Joongi, et al., "NBA (Network Balancing Act): A High-performance Packet Processing Framework for Heterogeneous Processors," EuroSys '15, Apr. 21-24, 2015, 14 pages, ACM, Bordeaux, France.

Muramatsu, Shin, et al., "VSE: Virtual Switch Extension for Adaptive CPU Core Assignment in softirq," 2014 IEEE 6th International Conference on Cloud Computing Technology and Science, Dec. 15-18, 2014, 6 pages, IEEE, Singapore.

Son, Jeongseok, et al., "Protego: Cloud-Scale Multitenant IPsec Gateway," Proceedings of the 2017 USENIX Annual Technical Conference (USENIX ATC '17), Jul. 12-14, 2017, 15 pages, USENIX Association, Santa Clara, CA.

* cited by examiner

P0 = ABC

```
┌─────────────────────────────────────┐
│  Apply a stretch factor to an input │
│  pattern to obtain a second pattern │
│                 502                 │
└─────────────────────────────────────┘
```

P1 = AAAABBBBCCCC

```
┌─────────────────────────────────────┐
│ Apply a repeat factor to the second │
│  pattern to obtain a third pattern  │
│                 504                 │
└─────────────────────────────────────┘
```

P2 = AAAABBBBCCCCAAAABBBBCCCC

```
┌─────────────────────────────────────┐
│  Partition the third pattern to     │
│       obtain a fourth pattern       │
│                 506                 │
└─────────────────────────────────────┘
```

P3 = AAAABB – BBCCCC – AAAABB – BBCCCC

```
┌─────────────────────────────────────┐
│     Compress the fourth pattern to  │
│      obtain the distribution pattern│
│                 508                 │
└─────────────────────────────────────┘
```

CORE TO RESOURCE MAPPING AND RESOURCE TO CORE MAPPING

CROSS REFERENCE TO OTHER APPLICATIONS

This application claims priority to U.S. Provisional Patent Application No. 62/664,781 entitled CORE TO RESOURCE MAPPING AND RESOURCE TO CORE MAPPING filed Apr. 30, 2018, which is incorporated herein by reference for all purposes.

BACKGROUND OF THE INVENTION

Network traffic is conventionally managed by a network device called an application delivery controller (ADC). The ADC manages access of content by handling client requests for content. The ADC load balances incoming client requests to servers. The host machine (ADC) performing the load balancing may have several cores. Conventional load balancers typically load balance any client request on any core to any server, typically by using a counter for each server to track when that server has been used by a core. The tracking of counters is memory and computationally intensive. In a distributed system, for example, as the number of cores in a host machine increases, the cost and complexity of tracking resource usage increases. Today, the number of cores on a host is typically anywhere from one to 128, and this number will grow as technology progresses. Thus, there is a need to efficiently allocate resources (such as servers) to cores (such as processing units) and vice versa.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
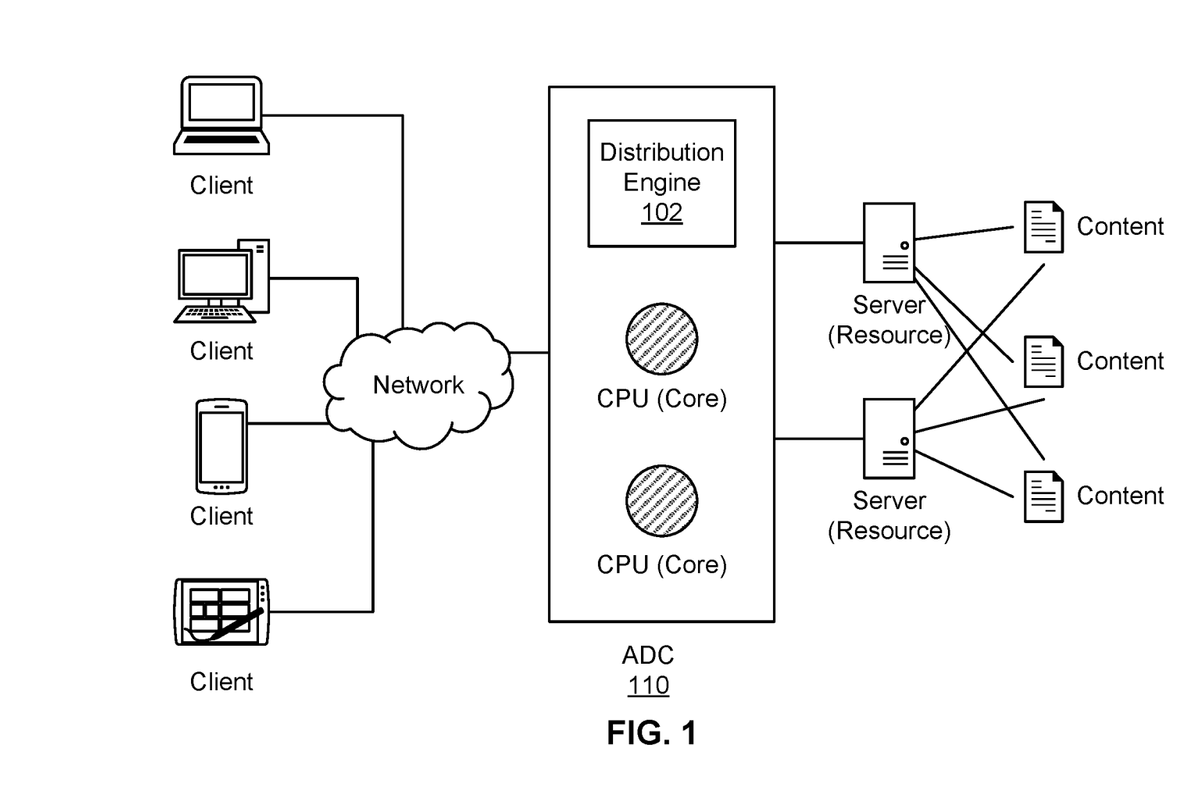
FIG. 1 is a block diagram illustrating an application delivery network in which cores can be mapped to resources and resources can be mapped to cores.

FIG. 1 is a block diagram illustrating an application delivery network in which cores can be mapped to resources and resources can be mapped to cores. The mapping can be performed according to the techniques described below. In this example, the application delivery network includes an application delivery controller (ADC) 110, four clients, two servers, and three content files. The clients provide an interface for users to access the content files. The clients can be implemented by any processing device, for example, a smartphone, tablet, desktop, computer, etc. The user may access the content via a web browser or other application executing on the clients. ADC 110 receives requests from the clients, and directs requests to the appropriate server(s). The request made by a client may be a request for one or more content files. The servers receive a request processed by ADC 110, determine a requested content, and respond to the requests by the clients. The content files can be content such as media items, files, dynamically generated responses, and the like. The number of clients, CPUs, servers, and content files shown here is merely exemplary and is not intended to be limiting.

In operation, the clients access the content (e.g., Hypertext Markup Language (HTML) files) by sending requests (e.g., Hypertext Transfer Protocol (HTTP) requests specifying the Universal Resource Identifiers (URIs) corresponding to the HTML files) to ADC 110. In response to receipt of the request, ADC 110 routes the request to one or more of the servers. The servers then permit access to the appropriate content file(s).

ADC 110 load balances incoming client side requests to the servers, where the host machine implementing ADC 110 performing the load balancing has several cores available. In the example shown in FIG. 1, the ADC host machines has two cores (CPUs). In a typical network management system, there are 16 servers and 128 cores in the host machine.

Given a set of resources (here, servers) to be used by an application, the typical approach is to access all resources on all cores (here, CPUs). Instead of applying the conventional technique of load balancing any client request on any core to any server, the techniques discussed below enable the option to use each server on a subset of cores only, and each core is assigned a fixed number of servers (e.g., just one server). Conversely, given 512 servers and 128 cores, each core is mapped to use four servers only and each server is used by only one core. This provides a flexible approach of mapping resources to a subset of the cores or vice versa.

In various embodiments, ADC 110 includes a distribution engine 102. Distribution engine 102 is configured to perform a distribution process to determine a mapping of resources to cores or cores to resources. Distribution engine 102 is configured to perform the process shown in the figures below, for example. The distribution engine may be implemented by a computer system such as the one shown in FIG. 12.

Although the examples below describe mapping of CPUs to servers in a load balancing context, the techniques also find application in other systems. For example, in a content distribution network, the cores are data centers and the resources are files. In a data center, server boxes/appliances are cores and the resources are files. A core is sometimes called a "processing unit" in this disclosure. A resource contains or generates data, while a core is a processing unit or acts as a gateway to access a resource.

Figure 2:
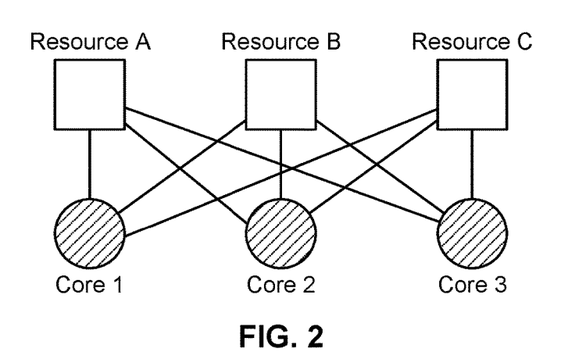
FIG. 2 shows an example mapping of resources to cores.

FIG. 2 shows an example mapping of resources to cores. In this example, there are three resources (Resource A, Resource B, and Resource C) and three cores (Core 1, Core 2, and Core 3). A line between a resource and a core represents the core being able to access the resource. Here, all cores are mapped to all resources, which means that all cores can access all resources. This is sometimes referred to as all resource being distributed to all cores or all cores being distributed to all resources. In conventional network management systems, this is a typical mapping because decision need not be made about how to distribute resources to cores.

As another example, consider the problem of placing a virtual service (resource) on the cores of a host. In some embodiments, a virtual service is a front-end abstraction that a load balancer provides, for example an IP address that an ADC uses to receive client requests. When a client connects to a virtual service address, the ADC processes the client connection or request against a list of settings, policies, and profiles and sends valid client traffic to a back-end server that is a member of the virtual service's pool of servers. In conventional systems, the virtual service is typically placed on all cores of the host, which means that the core is used to run a process that implements the virtual service. Using the example shown in FIG. 2, the virtual services are Resources A, B, C, and they are mapped to Cores 1, 2, 3. In various embodiments, using the techniques discussed below, each virtual service is placed on a subset of the cores of the host machine while imposing the same workload on each core (e.g., where workload is measured by the number of sessions, bandwidth, and the like).

In conventional systems, to prevent overloading of resources, a counter is maintained for each resource. When a resource is used on any core, the counter is incremented. However, depending on the way counters are implemented, issues of contention and concurrency may occur, which can be addressed by various tools such as programming language paradigms, CPU pinning, cache invalidation, locks, messaging, etc. The overhead of maintaining these counters or using these tools is high (e.g., incrementing the counter, locking), and the overhead increases as the number of cores increases.

The performance of the network system can be improved if the overhead is not so high. For example, response times to queries can decrease and less memory is used because not so many counters need to be stored or less CPU is used due to reduced contention during updates of counters. For a given task at hand, all resources do not necessarily have to be used on all cores for the system to perform adequately. In other words, a resource does not need to access all cores in order to meet a service level agreement or to provide sufficient performance. The mapping techniques described below distributes cores to resources or resources to cores such that not necessarily all of the resources are assigned to each core. Instead, a subset of resources may be allocated to a core or a subset of cores may be allocated to a resource. This improves the functioning of a network system because the amount of memory and processing cycles required for processing can be reduced.

Core to resource mapping and resource to core mapping is disclosed. Core affinity, which is the assignment of resources to cores, is determined, and a fixed number of resources are assigned to each core. Conversely, a fixed number of cores can be assigned to each resource. For example, when the resources are servers, a core-to-resource (s) mapping is performed. When the resources are virtual services, the mapping is inverted to obtain a resource-to-core(s) mapping. The resources do not have to be homogeneous or alike. They can be weighted, e.g., servers could have different capacities for handling traffic and may be weighted accordingly. Similarly, virtual services can have weights that denote the relative amount of traffic they are expected to handle in comparison to other virtual services. Cores on a host machine are usually alike in performance, though the techniques described here also find application in the context of cores with different weights.

Figure 3A:
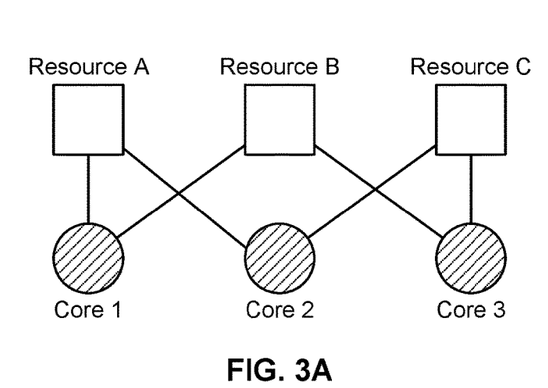
FIG. 3A shows an example mapping of resources to cores according to an embodiment of the present disclosure.
Figure 3B:
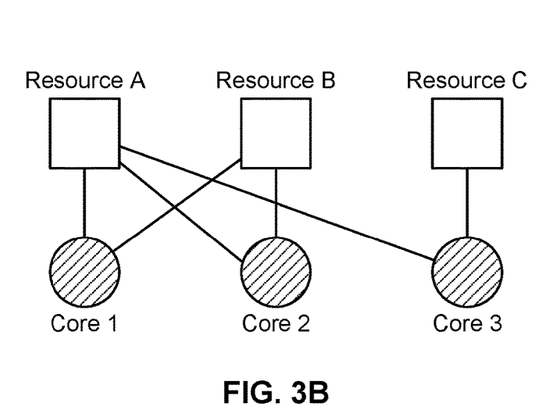
FIG. 3B shows another example mapping of resources to cores according to an embodiment of the present disclosure.

FIGS. 3A and 3B show example mappings that can be determined by the mapping process further described below.

FIG. 3A shows an example mapping of resources to cores according to an embodiment of the present disclosure. The number of resources and cores in this example is the same as in FIG. 2. However, unlike FIG. 2, each resource accesses two out of the three cores. More specifically, Resource A is mapped to Core 1 and Core 2, Resource B is mapped to Core 1 and Core 3, and Resource C is mapped to Core 2 and Core 3. As a result, if counters are maintained, the number of counters can be decreased and less memory and processing cycles are used to keep track of the loading of a resource. For example, instead of maintaining three counters per resource, only two are used. Inversely, if a single counter per resource is used across cores, updating it requires less CPU overhead due to reduced contention for concurrent updates. Although each resource in this example does not access all of the cores, using two of the cores alone may be sufficient for the resource's needs.

FIG. 3B shows another example mapping of resources to cores according to an embodiment of the present disclosure. The number of resources and cores in this example is the same as in FIG. 2. However, unlike FIG. 2, each resource is allocated a different number of cores. More specifically, Resource A is mapped to Core 1, Core 2, and Core 3; Resource B is mapped to Core 1 and Core 2, and Resource C is mapped to only Core 3. As a result, if counters are maintained, the number of counters can be decreased and less memory and processing cycles are used to keep track of the loading of a resource, or CPU contention is reduced when using a single counter per resource across cores. This mapping is different from the example in FIG. 3A because it accounts for the different needs of resources. The reason may be that Resource A has more needs than Resource B and Resource C. For example, Resource A tends to see more traffic than Resource B and Resource C, and therefore needs more processing power (cores). Thus, Resource A is allocated more cores than the other resources. Another reason for this allocation may be differing capacities of cores. For example, the cores may be implemented by different types of hardware and here Core 3 has the greatest processing ability. Thus, Resource C is mapped solely to Core 3 because Core 3 is adequate for Resource C's needs, and Core 3 is still able to devote some of its remaining processing ability to the other resources.

Figure 4:
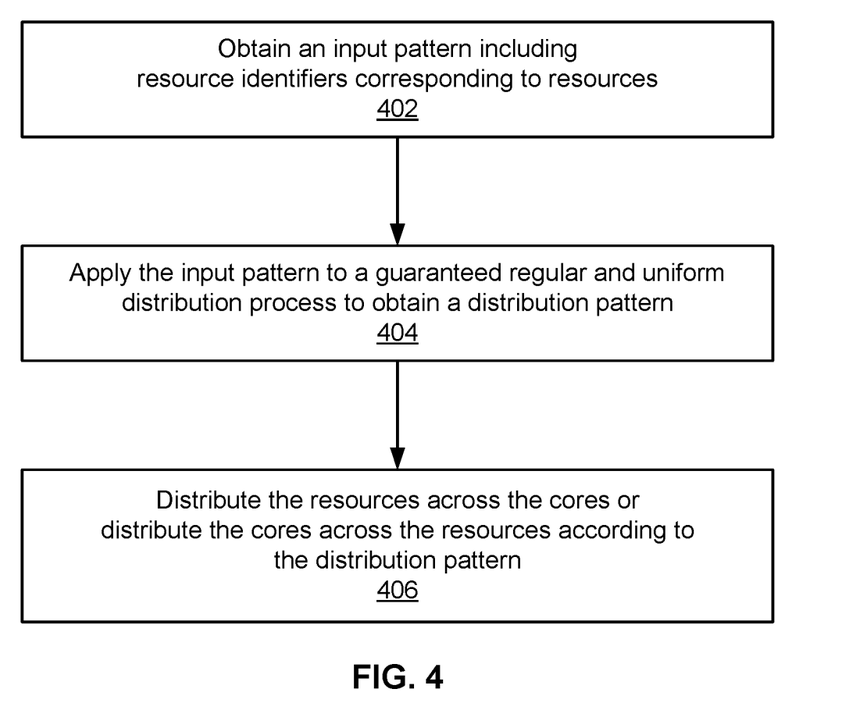
FIG. 4 is a flow chart illustrating an embodiment of a process to map resources to cores or cores to resources.

FIG. 4 is a flow chart illustrating an embodiment of a process to map resources to cores or cores to resources. This process may be implemented by a processor such as the one shown in FIG. 12 or a distribution engine such as the one shown in FIG. 1.

Figure 6:
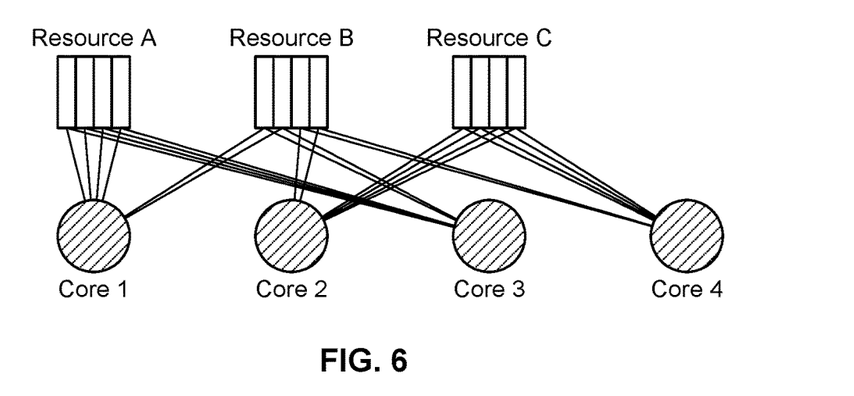
FIG. 6 shows an example mapping of cores to resources resulting from the process shown in FIG. 5.

At 402, an input pattern including resource identifiers corresponding to resources is obtained. The input pattern includes an ordered list of identifiers, which identifiers identify resources that are to be mapped to cores (or the cores may be mapped to the resources as further described below). In various embodiments, each resource is represented in the pattern in proportion to its weight, and the resource identifiers are contiguous. Referring to FIG. 6 in which there are three resources A, B, and C, an input pattern (P0) can be "ABC." In some embodiments, the order may be different, e.g., "BAC."

Returning to FIG. 4, at 404, the input pattern is applied to a guaranteed regular and uniform distribution process to obtain a distribution pattern. That is, the distribution process guarantees that the output will be regular and uniform from the perspective of the resources or the cores. The distribution process translates and manipulates the input pattern to produce a distribution pattern. As explained below, the distribution pattern can, alone or with other factors, define how resources are distributed to cores or how cores are distributed to resources. An example of a distribution pattern that maps cores to resources is: "1:{A:4, B:2}, 2:{B:2, C:4}, 3:{A:4, B:2}, 4:{B:2, C:4}." An example of a distribution that maps resources to cores is: "A:{U:4, W:4}, B:{U:2, V:2, W:2, X:2}, C:{V:4, X:4}," where U, V, W, and X are cores. These examples are explained in greater detail below.

In one aspect, the distribution pattern generated by the distribution process is guaranteed to be regular and uniform. This means that the resources are evenly divided among the cores or the cores are evenly divided among the resources. Unlike a round robin distribution process, which will provide an irregular and non-uniform distribution when the number of resources is not evenly divisible by the number of cores or vice versa, the distribution process here guarantees a regular and uniform mapping. In other words, regardless of the number of resources and the number of cores, a mapping results in equal and even sharing of resources or cores. In the case of weighted resources, the uniformity and regularity of the mapping is observed when taking the weights into account.

Examples of distribution processes that can be applied to an input pattern is shown in FIGS. 5, 7, 8, and 10.

At 406, the resources are distributed across the cores or the cores are distributed across the resources according to the distribution pattern. Whether resources are distributed to cores or cores to resources is responsive to a user's selection. Referring to FIG. 6, and the resource-to-core distribution pattern (1:{A:4, B:2}, 2:{B:2, C:4}, 3:{A:4, B:2}, 4:{B:2, C:4}), four portions of Resource A and two portions of Resource B are distributed to Core 1, two portions of Resource B and four portions of Resource C are distributed to Core 2, four portion of Resource A and two portions of Resource B are distributed to Core 3, and two portions of Resource B and four portions of Resource C are distributed to Core 4. Assuming that Resources A, B, and C are equal, the amount of resources distributed to each core is equal.

The input pattern may be contiguous or non-contiguous. An example of a contiguous pattern is: AABBCCCC because identifiers of the same type (A is one type of identifier, B is another type, and C yet another type) are next to each other. An example of a non-contiguous pattern is: ABACB. In various embodiments, if the input pattern is non-contiguous, then prior to applying the input pattern to the distribution process (404), the resource identifiers in the input pattern are sorted to make the input pattern contiguous. In one aspect, a contiguous pattern keeps the mapping small such that the number of cores mapping to resources (or resources mapping to cores) is lower. This reduces the overhead in terms of memory used for counters or CPU contention. As further described below, a non-contiguous pattern can be used to represent placeholder resources/headroom. In some embodiments, the pattern is allowed to be non-contiguous for the headroom identifiers only such that if the headroom resource identifier is excluded, the rest of the pattern is contiguous.

In various embodiments, mapping can be performed more than once. For example, resources and cores that have been previously mapped can be added to an input pattern to determine a subsequent mapping of resources to cores or cores to resources.

Figure 5:
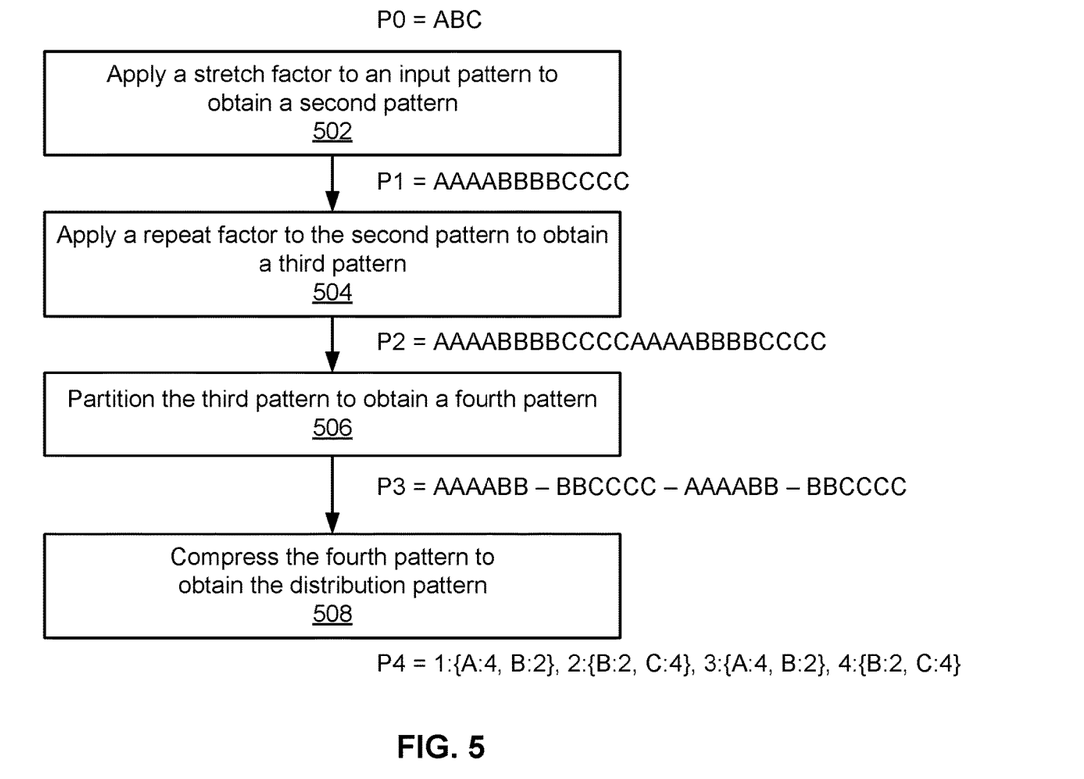
FIG. 5 is a flow chart illustrating an embodiment of a process to map cores to resources.
Figure 7:
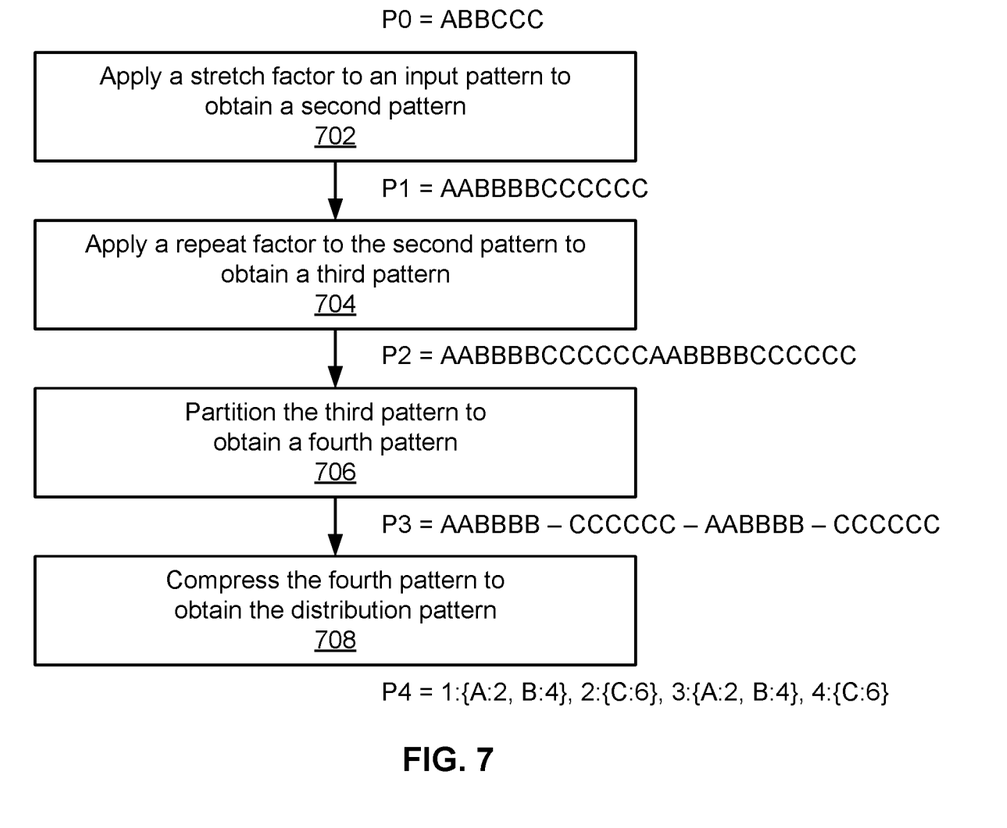
FIG. 7 is a flow chart illustrating an embodiment of a process to map resources to cores.

The following figures are examples of distribution processes. FIGS. 5-7 are examples of resource to core mapping. FIGS. 8-11 are examples of core to resource mapping.

FIG. 5 is a flow chart illustrating an embodiment of a process to map cores to resources. This process may be implemented by a processor such as the one shown in FIG. 12 or a distribution engine such as the one shown in FIG. 1. This process may be performed as part of another process, for example as part of 404 of FIG. 4.

Consider a host machine with c cores and r resources. The process shown in FIG. 5 is performed to achieve a core-to-resource mapping using a pattern that is constructed and/or modified during the process. Suppose the number of cores is c=4 and the number of resources is r=3. Let the r resources be denoted by the symbols A, B, and C. Referring to FIG. 6, the r resources are Resource A, Resource B, and Resource C and the c cores are Core 1, Core 2, Core 3, and Core 4. The initial pattern (input pattern P0) is an ordered list of resource identifiers:

P0: ABC

In various embodiments, the order is arbitrary but fixed once selected. At 502, a stretch factor is applied to an input pattern to obtain a second pattern. In various embodiment, a goal of the "stretch" step is to build the smallest pattern of resources that can be (but are not yet) evenly divided to cores. In various embodiments, the stretch factor "sf" is given by c/GCD(c, r). Here, GCD is a function that computes a greatest common divisor of its arguments. With c=4, r=3, the stretch factor is 4/1=4. Each resource identifier in the pattern is then stretched by the stretch factor by replacing each resource identifier with "sf" identical resource identifiers.

The input pattern P0 is stretched by replacing each resource identifier with 4 identical resource identifiers to obtain a second pattern P1:

P1: AAAABBBBCCCC

The length of the obtained pattern (P1) is "r*sf=LCM(c, r)" where LCM is the lowest common multiple. Thus, the length of this pattern is a multiple of the number of cores. The stretch factor in various embodiments can be any integral multiple of the smallest value, although keeping sf as small as possible helps keep the associated overhead low, at least in this example. The associated overhead can be the number of cores a resource maps to, which determines how many counters are used or how much CPU contention there is for updating a resource counter. In various embodiments, a sf that is an integer guarantees a regular and uniform mapping. For the example above, this smallest sf=4 is used. The input pattern P0 may be obtained earlier for example at 402 of FIG. 4.

At 504, a repeat factor is applied to the second pattern to obtain a third pattern. In various embodiments, a goal of the "repeat" step is to transform the pattern based on a configurable value called a repeat factor "rf," which is a positive integer. Let rf=2 in this example. This means that the pattern is rf copies of the second pattern. The second pattern P1 is duplicated (rf−1) times to obtain the third pattern P2:

P2: AAAABBBBCCCCAAAABBBBCCCC

The repeat factor is user configurable and can be input at a user interface and received by the device performing the process of FIG. 5. In various embodiments, a goal of the "repeat factor" configuration is to provide a parameter to control the number of cores that a resource maps to. As a repeat factor increases, the number of different resources a core uses is likely to increase (but not guaranteed to, due to kerning in the pattern after partitioning as further described below). Similarly, as the repeat factor increases, the number of different cores a resource is mapped to is also likely to increase (again, with allowances for kerning). A user can choose an rf value to control overhead. Typically, a lower repeat factor corresponds to lower overhead at the expense of being relatively less flexible. A lower repeat factor corresponds to less distributed or more restricted mapping.

At 506, the third pattern is partitioned to obtain a fourth pattern. In some embodiments, the number of partitions into which the third pattern is partitioned is the number of cores to which the resources are to be mapped. Since the length of pattern P1 is an integral multiple of the number of cores, the length of P2 is also a multiple of the number of cores. The third pattern P2 is evenly partitioned into c (here, c=4) partitions—one for each core—to obtain the fourth pattern P3:

P3: AAAABB-BBCCCC-AAAABB-BBCCCC

At 508, the fourth pattern is compressed to obtain a distribution pattern. The distribution pattern can be used to distribute cores across resources as described in 406 of FIG. 4. Compression translates duplicate resource identifiers within a particular partition to a number. Referring to the first partition in pattern P3 (AAAABB), the compression is (A:4, B:2) because there are four instance of A and two instances of B. Compression helps to discover weights for each resource identifier assigned to a core. The fourth pattern P3 is compressed to obtain the distribution pattern P4:

P4: 1:{A:4, B:2}, 2:{B:2, C:4}, 3:{A:4, B:2}, 4:{B:2, C:4}

In various embodiments, even if the resources are not weighted, the final mapping is weighted. Effectively, each of the r resources has been split into multiple sub-resources.

Pattern P4 is read as: Core 1 is allocated to four portions of Resource A and two portions of Resource B. Core 2 is allocated to two portions of Resource B and four portions of Resource C. Core 3 is allocated to four portions of Resource A and two portions of Resource B. Core 4 is allocated to two portions of Resource B and four portions of Resource C. In this example, each core is assigned 6 units of sub-resources, 4 of which are provided by one resource and 2 by another resource.

In this example, some resources are mapped to 2 cores while others are mapped to 4 cores. This effect is called "kerning" because the assignment of resources appears to be non-uniform (some resources are mapped to 2 cores while others are mapped to 4 cores). However, the kerning is simply an artifact because each core has access to the same fraction of total resources. In this example, out of 3 resources, each of the 4 cores has access to ¾ of the resources via sub-resources, which is an exact division without resorting to fractions as fraction arithmetic is prone to rounding errors in limited precision hardware. Therefore, the assignment of resources is regular and uniform.

FIG. 6 shows an example mapping of cores to resources resulting from the process shown in FIG. 5. The distribution of cores to resources in this example is according to the example pattern P4 obtained above, i.e., 1:{A:4, B:2}, 2:{B:2, C:4}, 3:{A:4, B:2}, 4:{B:2, C:4}. As shown, Core 1 is allocated to Resource A and Resource B in the ratio 4:2. Core 2 is allocated to Resource B and Resource C in the ratio 2:4. Core 3 is allocated to Resource A and Resource B in the ratio 4:2. Core 4 is allocated to Resource B and Resource C in the ratio 2:4.

In a load balancing example, with this distribution pattern P4, client requests arriving at Core 2 are load balanced to servers (resources) B and C in the ratio 2:4 (in other words, for every 2 requests load balanced to B, there are 4 requests load balanced to C). Core 2 does not use server A. Thus, this is an example in which all resources are not used on all cores, but each core is still able to meet performance requirements. At the same time, each core has access to an equivalent number of sub-resources, which means core-to-resource(s) mapping is uniform.

In some cases, all the resources are not alike in the sense that some resources have greater capability than others. FIG. 7 is an example process of mapping resourcing to cores for such a situation in which resources have unequal capabilities. For example, a first resource may be implemented by hardware with greater processing power than a second resource.

FIG. 7 is a flow chart illustrating an embodiment of a process to map resources to cores. This process may be implemented by a processor such as the one shown in FIG. 12 or a distribution engine such as the one shown in FIG. 1. This process may be performed as part of another process, for example as part of 404 of FIG. 4.

The system structure is the same as the one described for FIG. 5 (4 cores and 3 resources) except that the resources have unequal capabilities. The unequal capabilities are accounted for in the initial input pattern by weighting the resource identifiers to account for their varying processing abilities. Suppose that Resource B is twice as capable as Resource A and Resource C is three times as capable as Resource A. The input pattern can encode this information about the unequal capabilities of the resources. For example, input pattern P0 duplicates each resource identifier the number of times corresponding to its ability. In various embodiments, the resource identifier is duplicated adjacently so that the pattern is contiguous meaning that resource identifiers of the same type are grouped together, like "ABBCCC."

In the example discussed above, suppose Resources A, B, C have weights 1, 2, and 3 respectively. The input pattern P0 is:

P0: ABBCCC

The number of resources r is now the sum of the weights of all the resources, here r=6. In some embodiments, all weights may be scaled down by a factor of GCD of all the weights.

At 702, a stretch factor is applied to an input pattern to obtain a second pattern. The stretch factor is applied in the same manner as in 502 of FIG. 5. Here, the stretch factor sf=2 because sf=c/GCD(r, c). r=6 and c=4. 4/GCD(6, 4)=2. Applying sf=2 to the input pattern P0 obtains the second pattern P1:

P1: AABBBBCCCCCC

At 704, a repeat factor is applied to the second pattern to obtain a third pattern. The repeat factor is applied in the same manner as in 504 of FIG. 5. Here, suppose repeat factor=2 is selected. Then, applying rf=2 to the second pattern P1 obtains the third pattern P2:

P2: AABBBBCCCCCCAABBBBCCCCCC

At 706, the third pattern is partitioned to obtain a fourth pattern. The partitioning is performed in the same manner as 506 of FIG. 5. The third pattern P2 is partitioned into c=4 cores to obtain the fourth pattern P3:

P3: AABBBB-CCCCCC-AABBBB-CCCCCC

At 708, the fourth pattern is compressed to obtain a distribution pattern. The compression is performed in the same manner as 508 of FIG. 5. The fourth pattern P3 is compressed to obtain the distribution pattern P4:

P4: 1:{A:2, B:4}, 2:{C:6}, 3:{A:2, B:4}, 4:{C:6}

The distribution pattern guarantees a regular and uniform distribution in the desired ratio 1:2:3 with respect to Resources A, B, C. Specifically, 4 portions of Resource A are allocated, 8 portions of Resource B are allocated, and 12 portions of C are allocated. Resource A, B, and C are assigned to 2 cores only instead of all 4 cores.

The distribution process can be applied to a variety of resources including placeholder resources. A placeholder resource is a resource that is reserved for a purpose that is not currently known. Reserving resources can be useful for example to accommodate applications that are as yet unknown. In a network traffic management setting, cores on a host machine are typically virtualized, and a machine may host many applications including some that the administrator is not yet aware of. The placeholder resources can later be used for those unknown applications or for background work.

Placeholder resources can be used with regular resources when performing a distribution process to determine a distribution pattern. In various embodiments, an input pattern is constructed to include one or more placeholder resources. If the number of resources were only 2 (say, A and B), but the core-to-resource(s) mapping is performed with an extra placeholder resource (say C), a mapping is obtained where there are placeholders in the pattern corresponding to where C is mapped to. This corresponds to leaving empty spaces on cores, e.g., to support applications that are as yet unknown or to reserve space for other purposes. The number of such placeholder resources and their interleaving with actual resources in the input pattern P0 can be used to determine mappings that achieve different goals, e.g., leaving a subset of cores with no assigned tasks, or allowing some spare headroom (placeholder) on all cores. For example, more interleaving (e.g., ACBC) corresponds to placeholders on all cores while less interleaving (ABCC) corresponds to leaving an entire core(s) with no assigned tasks.

The preceding examples are examples of distributions of cores to resources. In the context of network traffic management, placing virtual services on the subsets of cores of a host machine cores is an example of a resource-to-core(s) mapping problem, which is an inverse of the core-to-resource(s) mapping problem. The resource-to-core(s) mapping problem can be solved by using a pattern building approach like the one described above. However, instead of the "compress" step (e.g., 508, 708) described above, a "collect" step is used. The following figures show examples of mapping resources to cores.

Figure 8:
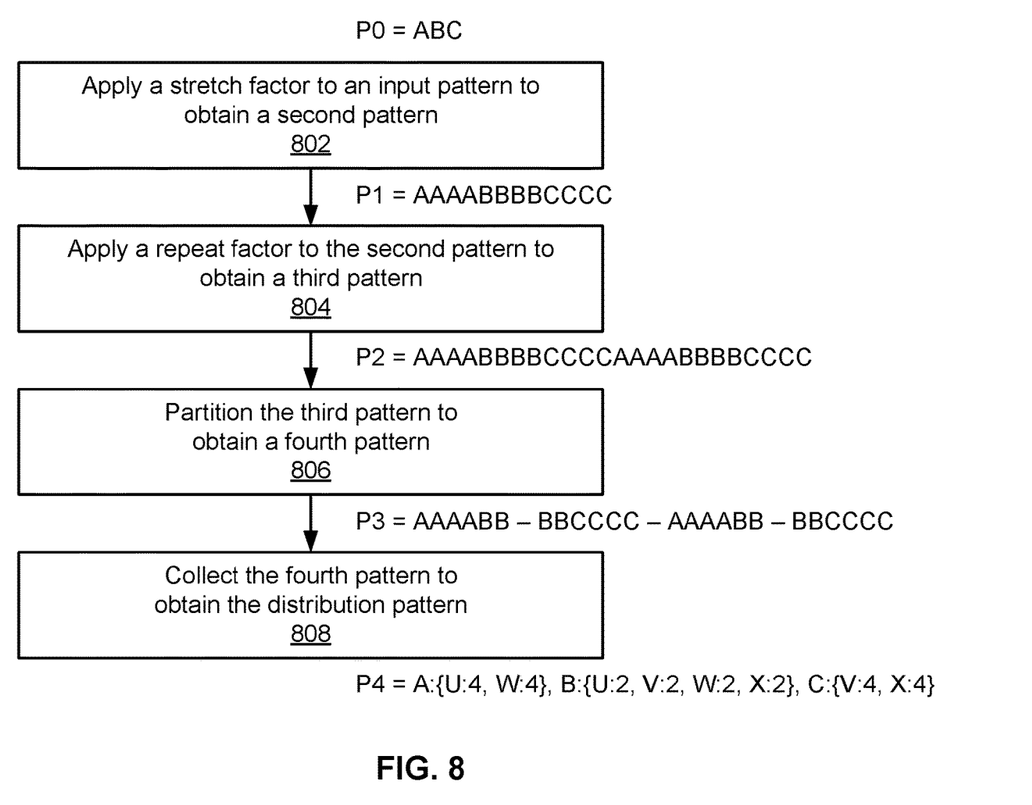
FIG. 8 is a flow chart illustrating an embodiment of a process to map resources to cores.

FIG. 8 is a flow chart illustrating an embodiment of a process to map resources to cores. This process may be implemented by a processor such as the one shown in FIG. 12 or a distribution engine such as the one shown in FIG. 1. This process may be performed as part of another process, for example as part of 404 of FIG. 4.

Consider a host machine with c cores and r resources. As an example, let c=4 and denote the cores by the symbols U, V, W, and X. Let r=3 and denote the resources by the symbols A, B, and C. Thus, the input pattern P0 is:

P0: ABC

At 802, a stretch factor is applied to an input pattern to obtain a second pattern. The stretch factor is applied in the same manner as in 502 of FIG. 5. Here, the stretch factor sf=4 because sf=c/GCD(r, c). r=3 and c=4. 4/GCD(3, 4)=4. Applying sf=4 to the input pattern P0 obtains the second pattern P1:

P1: AAAABBBBCCCC

At 804, a repeat factor is applied to the second pattern to obtain a third pattern. The repeat factor is applied in the same manner as in 504 of FIG. 5. Here, suppose repeat factor=2 is selected. Then, applying rf=2 to the second pattern P1 obtains the third pattern P2:

P2: AAAABBBBCCCCAAAABBBBCCCC

At 806, the third pattern is partitioned to obtain a fourth pattern. The partitioning is performed in the same manner as 506 of FIG. 5. The third pattern P2 is partitioned into c=4 cores to obtain the fourth pattern P3:

P3: AAAABB-BBCCCC-AAAABB-BBCCCC

At 808, the fourth pattern is collected to obtain a distribution pattern. Each resource is mapped to the core partitions it falls in, and the number of times the resource is present in each core partition is counted. Collecting the fourth pattern P3 obtains the distribution pattern P4, which is a mapping of resources to cores:

P4: A:{U:4, W:4}, B:{U:2, V:2, W:2, X:2}, C:{V:4, X:4}

Pattern P4 is read as: Resource A is assigned to Core U and Core W in the ratio 4:4. Resource B is assigned to Core U, Core V, Core W, and Core X in the ratio 2:2:2:2. Resource C is assigned to Core V and Core X in the ratio 4:4. Even when the resources are unweighted to begin with, after the performing the process of FIG. 8, the mapping discovers weights. Like the example described above, each core is assigned six units of sub-resources across all resources where each resource is comprised of eight sub-resources. Hence, as a resource-to-core(s) mapping mechanism, each core is uniformly loaded.

The example described with respect to FIG. 7 in which resources are weighted also applies to the process described here. For example, the input pattern would be formed to reflect the weights of the resources and the process of FIG. 8 is performed to obtain a distribution of resources to cores.

Figure 9:
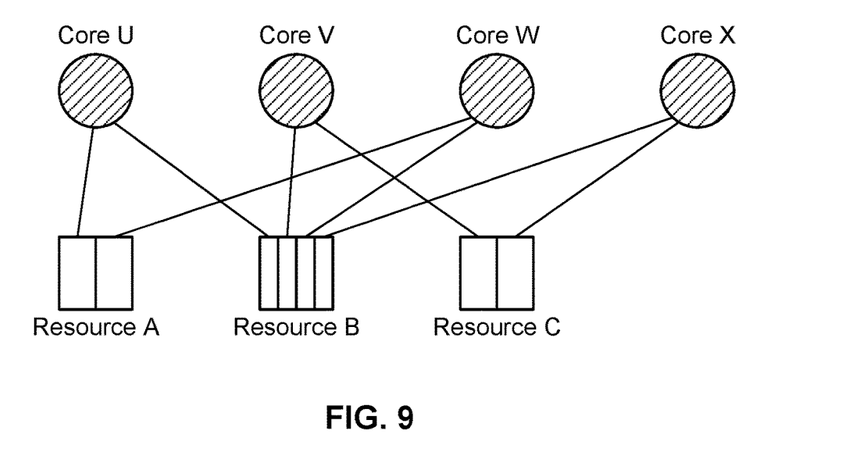
FIG. 9 shows an example mapping of resources to cores resulting from the process shown in FIG. 8.

FIG. 9 shows an example mapping of resources to cores resulting from the process shown in FIG. 8. The distribution of cores to resource in this example is according to the example pattern P4 obtained above, i.e., A:{U:4, W:4}, B:{U:2, V:2, W:2, X:2}, C:{V:4, X:4}. As shown, Resource A maps to cores U and W in the ratio 4:4, while Resource B maps to all cores with weight 2, and Resource C maps to cores V and X in the ratio 4:4. For simplicity, the ratios have been simplified so that Resource A maps to Cores U and W in ratio 1:1. Instead, Resource A can be pictured with further subdivisions to map in the ratio 4:4.

Figure 10:
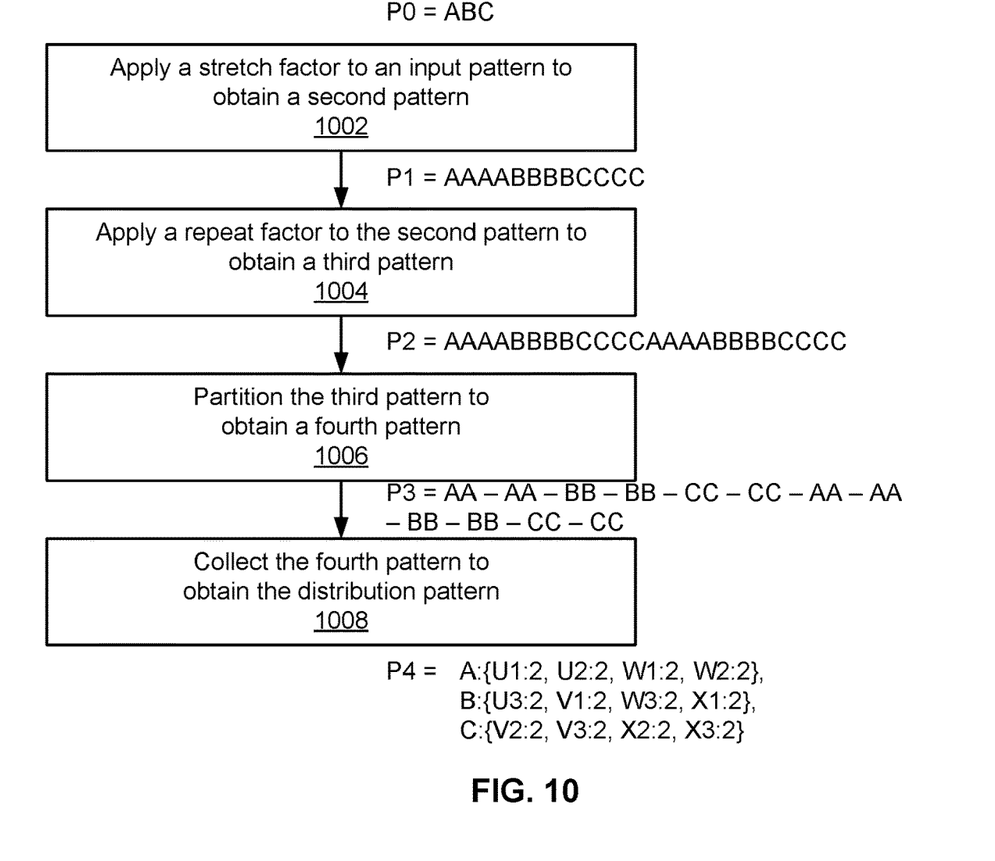
FIG. 10 is a flow chart illustrating an embodiment of a process to map resources to cores in which cores have sub-cores.

In some embodiments, virtual partitioning of a core into sub-cores at the hardware, hypervisor, or operating system level is possible, and the resource-to-core(s) mapping can use the concept of sub-cores to enable mapping at a finer granularity. The following figure illustrates one such example.

FIG. 10 is a flow chart illustrating an embodiment of a process to map resources to cores in which cores have sub-cores. This process may be implemented by a processor such as the one shown in FIG. 12 or a distribution engine such as the one shown in FIG. 1. This process may be performed as part of another process, for example as part of 404 of FIG. 4.

Unlike the example of FIG. 9, which has four cores, the cores in this example each has sub-cores. Referring to FIG. 10, each core U, V, W, X is comprised of a number (sc) of sub-cores. In one aspect, this sub-core abstraction may be useful when the number of resources is much larger than the number of cores and the operating system provides constructs to schedule tasks on a core in a weighted manner. Here, there are 3 sub-cores per core (sc=3), which is represented as shown. Sub-cores U1, U2, U3 make up Core U; sub-cores V1, V2, V3 make up Core V, sub-cores W1, W2, W3 make up Core W; and sub-cores X1, X2, X3 make up Core X. Thus, the input pattern P0 is:

P0: ABC

At 1002, a stretch factor is applied to an input pattern to obtain a second pattern. The stretch factor is applied in the same manner as in 802 of FIG. 8. The computation of the stretch factor involve replacing the total number of cores c with the total number of sub-cores c*sc. Applying sf=4 to the input pattern P0 obtains the second pattern P1:

P1: AAAABBBBCCCC

At 1004, a repeat factor is applied to the second pattern to obtain a third pattern. The repeat factor is applied in the same manner as in 804 of FIG. 8. Here, suppose repeat factor=2 is selected. Then, applying rf=2 to the second pattern P1 obtains the third pattern P2:

P2: AAAABBBBCCCCAAAABBBBCCCC

At 1006, the third pattern is partitioned to obtain a fourth pattern. The partitioning is performed in the same manner as 806 of FIG. 8. The third pattern P2 is partitioned into c*sc=12 sub-cores to obtain the fourth pattern P3:

P3: AA-AA-BB-BB-CC-CC-AA-AA-BB-BB-CC-CC

At 1008, the fourth pattern is collected to obtain a distribution pattern. Each resource is mapped to the sub-core partitions it falls in, and the number of times the resource is present in each sub-core partition is counted. Collecting the fourth pattern P3 obtains the distribution pattern P4, which is a mapping of resources to sub-cores:

P4: A:{U1:2, U2:2, W1:2, W2:2},
B:{U3:2, V1:2, W3:2, X1:2},
C:{V2:2, V3:2, X2:2, X3:2}

Pattern P4 is read as follows. Resource A is allocated to the sub-cores as follows: two portions are assigned to Sub-core U1, two portions are assigned to Sub-core U2, two portions are assigned to Sub-core W1, and two portions are assigned to Sub-core W2. Resource B is allocated to the cores as follows: two portions are assigned to Sub-core U3, two portions are assigned to Sub-core V1, two portions are assigned to Sub-core W3, and two portions are assigned to Sub-core X1. Resource C is allocated as follows: two portions are assigned to Sub-core V2, two portions are assigned to Sub-core V3, two portions are assigned to Sub-core X2, and two portions are assigned to Sub-core X3.

Figure 11:
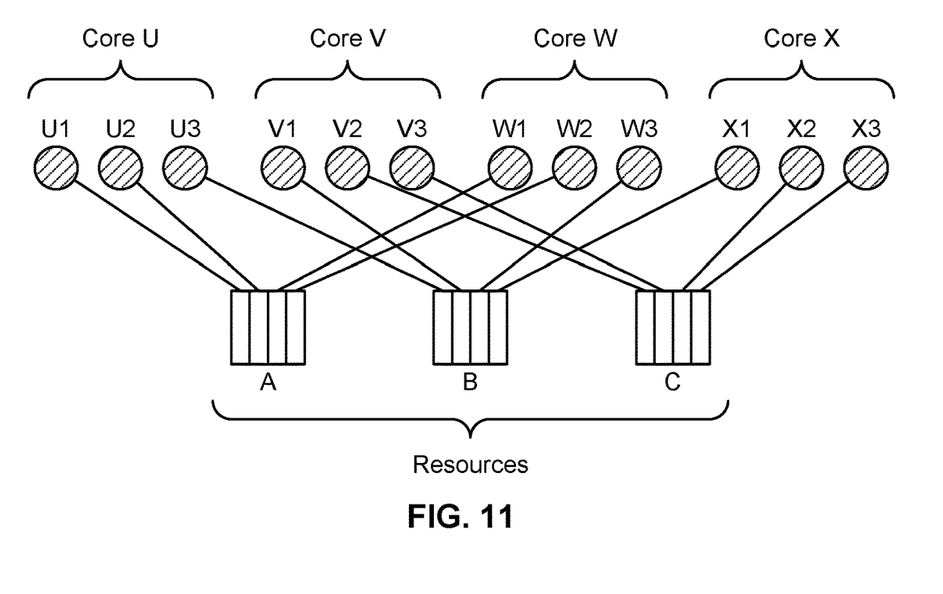
FIG. 11 shows an example mapping of resources to sub-cores resulting from the process shown in FIG. 10.

FIG. 11 shows an example mapping of resources to sub-cores resulting from the process shown in FIG. 10. The distribution of cores to resource in this example is according to the example pattern P4 obtained above, i.e., A:{U1:2, U2:2, W1:2, W2:2}, B:{U3:2, V1:2, W3:2, X1:2}, C:{V2:2, V3:2, X2:2, X3:2}. The diagram has been simplified so that each sub-block of a Resource represents two portions of that resource. As shown, Resource A maps to Sub-cores U1, U2, W1, and W2 in the ratio 2:2:2:2, while Resource B maps to Sub-cores U3, V1, W3, and X1 in the ratio 2:2:2:2, and Resource C maps to Sub-cores V2, V3, X2, and X3 in the ratio 2:2:2:2.

There are many benefits to the mapping techniques described above. Benefits of these techniques include lower overhead in terms of memory requirements, CPU overhead, and concurrency related coordination because the same performance can be achieved by using only a subset of resources on a core or a subset of cores for a resource. Moreover, in a large scale distributed system with heterogeneous hosts, mapping can be addressed locally at the host without requiring centralized coordination (centralized coordination may lead to issues with scalability).

Figure 12:
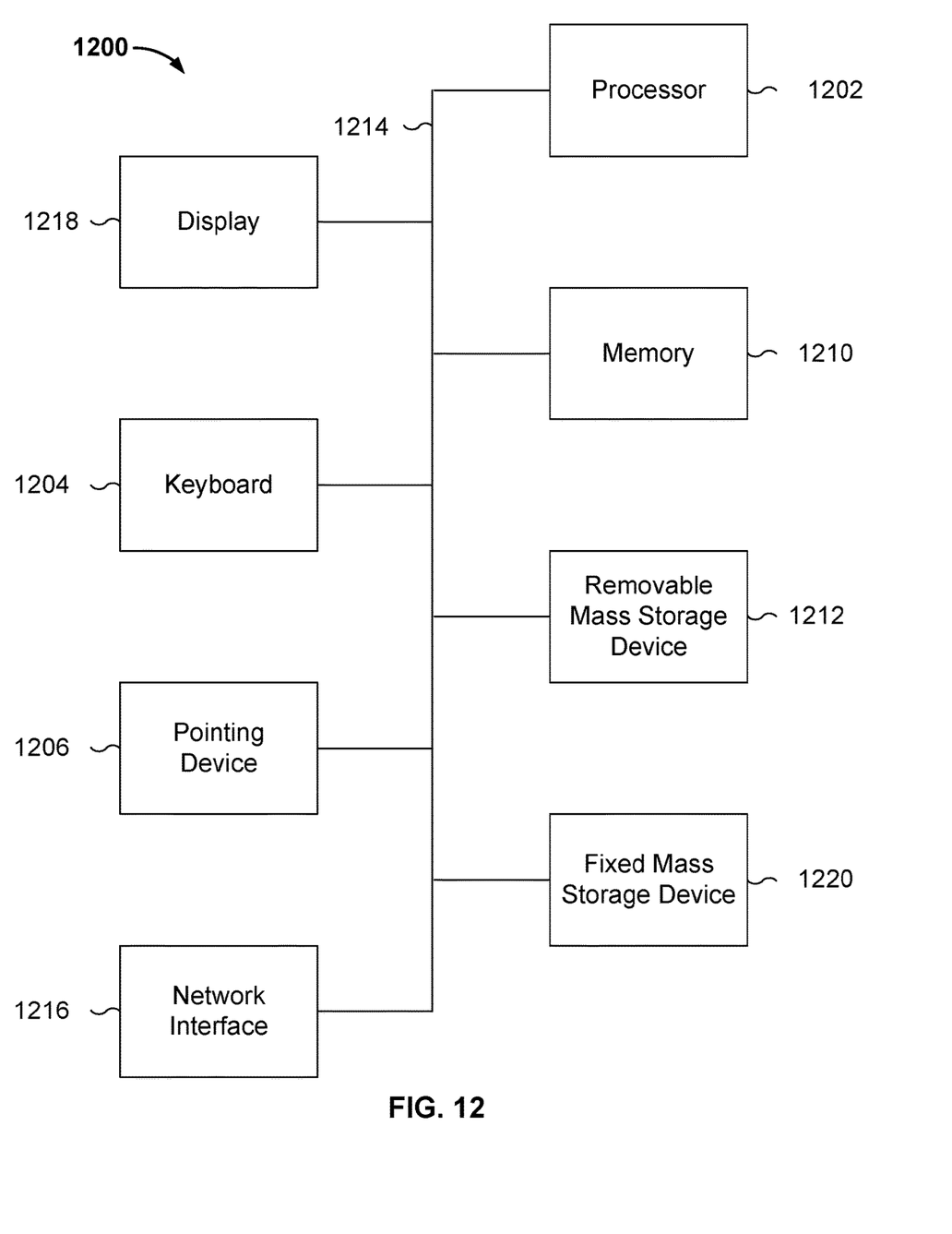
FIG. 12 is a functional diagram illustrating a programmed computer system for mapping resources to cores of cores to resources in accordance with some embodiments.

FIG. 12 is a functional diagram illustrating a programmed computer system for mapping resources to cores of cores to resources in accordance with some embodiments. As will be apparent, other computer system architectures and configurations can be used to perform the described mapping technique. Computer system 1200, which includes various subsystems as described below, includes at least one microprocessor subsystem (also referred to as a processor or a central processing unit (CPU) 1202). For example, processor 1202 can be implemented by a single-chip processor or by multiple processors. In some embodiments, processor 1202 is a general purpose digital processor that controls the operation of the computer system 1200. In some embodiments, processor 1202 also includes one or more coprocessors or special purpose processors (e.g., a graphics processor, a network processor, etc.). Using instructions retrieved from memory 1210, processor 1202 controls the reception and manipulation of input data received on an input device 1206, and the output and display of data on output devices (e.g., display 1218).

Processor 1202 is coupled bi-directionally with memory 1210, which can include, for example, one or more random access memories (RAM) and/or one or more read-only memories (ROM). As is well known in the art, memory 1210 can be used as a general storage area, a temporary (e.g., scratch pad) memory, and/or a cache memory. Memory 1210 can also be used to store input data and processed data, as well as to store programming instructions and data, in the form of data objects and text objects, in addition to other data and instructions for processes operating on processor 1202. Also as is well known in the art, memory 1210 typically includes basic operating instructions, program code, data, and objects used by the processor 1202 to perform its functions (e.g., programmed instructions). For example, memory 1210 can include any suitable computer readable storage media described below, depending on whether, for example, data access needs to be bi-directional or uni-directional. For example, processor 1202 can also directly and very rapidly retrieve and store frequently needed data in a cache memory included in memory 1210.

A removable mass storage device 1212 provides additional data storage capacity for the computer system 1200, and is optionally coupled either bi-directionally (read/write) or uni-directionally (read only) to processor 1202. A fixed mass storage 1220 can also, for example, provide additional data storage capacity. For example, storage devices 1212 and/or 1220 can include computer readable media such as magnetic tape, flash memory, PC-CARDS, portable mass storage devices such as hard drives (e.g., magnetic, optical, or solid state drives), holographic storage devices, and other storage devices. Mass storages 1212 and/or 1220 generally store additional programming instructions, data, and the like that typically are not in active use by the processor 1202. It will be appreciated that the information retained within mass storages 1212 and 1220 can be incorporated, if needed, in standard fashion as part of memory 1210 (e.g., RAM) as virtual memory.

In addition to providing processor 1202 access to storage subsystems, bus 1214 can be used to provide access to other subsystems and devices as well. As shown, these can include a display 1218, a network interface 1216, an input/output (I/O) device interface 1204, an image processing device 1206, as well as other subsystems and devices. For example, image processing device 1206 can include a camera, a scanner, etc.; I/O device interface 1204 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1200. Multiple I/O device interfaces can be used in conjunction with computer system 1200. The I/O device interface can include general and customized interfaces that allow the processor 1202 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1216 allows processor 1202 to be coupled to another computer, computer network, or telecommunications network using a network connection as shown. For example, through the network interface 1216, the processor 1202 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1202 can be used to connect the computer system 1200 to an external network and transfer data according to standard protocols. For example, various process embodiments disclosed herein can be executed on processor 1202, or can be performed across a network such as the Internet, intranet networks, or local area networks, in conjunction with a remote processor that shares a portion of the processing. Additional mass storage devices (not shown) can also be connected to processor 1202 through network interface 1216.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 12 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1204 and display 1218 share the touch sensitive screen component, which both detects user inputs and displays outputs to the user). In addition, bus 1214 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for generating a uniform assignment list assigning a plurality of resources to a plurality of processing cores of a multi-core processor of a device, the plurality of resources comprising at least one of servers and virtual services for processing resource requests, the method comprising:

obtaining an input pattern including a plurality of resource identifiers corresponding to the plurality of resources;

applying a stretch factor to the input pattern by repeating each resource identifier to obtain a second pattern comprising sets of contiguous resource identifiers each at least as long as the stretch factor;

applying a repeat factor to the second pattern by repeating the second pattern to obtain a third pattern, wherein the repeat factor is a parameter that affects a number of processing cores that a resource of the plurality of resources maps to;

partitioning the third pattern according to a number of processing cores in the plurality of processing cores to obtain a fourth pattern;

compressing the fourth pattern to generate the uniform assignment list that assigns different sets of resources in the plurality of resources to different processing cores in the plurality of processing cores; and configuring each particular processing core of the multi-core processor of the device to select, for each resource request received by the particular processing core, a resource from the set of resources assigned to the particular processing core by the uniform assignment list and to forward the resource request to the selected resource, wherein each particular processing core forwards resource requests, which are directed to the plurality of resources and which the particular processing core receives, to the set of resources that are assigned to the particular processing core based on the uniform assignment list.

2. The method of claim 1, wherein at least one of (1) a resource in the plurality of resources and (2) a processing core in the plurality of processing cores was previously the subject of an assignment based on a previously generated assignment pattern.

3. The method of claim 1, wherein the stretch factor is equal to the number of processing cores in the plurality of processing cores divided by the greatest common divisor of: the number of processing cores in the plurality of processing cores and a number of resources in the plurality of resources.

4. The method of claim 1, wherein the repeat factor is user configurable.

5. The method of claim 1, wherein the plurality of resources includes at least one placeholder resource and the uniform assignment list includes the at least one placeholder resource.

6. The method of claim 1, wherein different input patterns result in different uniform assignment lists.

7. The method of claim 1, wherein the uniform assignment list is uniform with respect to the weights associated with the plurality of resources.

8. The method of claim 1, wherein, after selecting the resource for processing the request, the particular processing core updates a counter associated with the resource selected.

9. The method of claim 8, wherein the assignment of the sets of resources reduces the number of processing cores in the plurality of processing cores that update counters associated with each particular resource in the plurality of resources.

10. A non-transitory machine readable medium storing a program for execution by at least one processing unit, the program for generating a uniform assignment list assigning a plurality of resources to a plurality of processing cores of a multi-core processor of a device, the plurality of resources comprising at least one of servers and virtual services for processing resource requests, the program comprising sets of instructions for:
  obtaining an input pattern including a plurality of resource identifiers corresponding to the plurality of resources;
  applying a stretch factor to the input pattern by repeating each resource identifier to obtain a second pattern comprising sets of contiguous resource identifiers each at least as long as the stretch factor;
  applying a repeat factor to the second pattern by repeating the second pattern to obtain a third pattern, wherein the repeat factor is a parameter that affects a number of processing cores that a resource of the plurality of resources maps to;
  partitioning the third pattern according to a number of processing cores in the plurality of processing cores to obtain a fourth pattern;
  compressing the fourth pattern to generate the uniform assignment list that assigns different sets of resources in the plurality of resources to different processing cores in the plurality of processing cores; and
  configuring each particular processing core of the multi-core processor of the device to select, for each resource request received by the particular processing core, a resource from the set of resources assigned to the particular processing core by the uniform assignment list and to forward the resource request to the selected resource, wherein each particular processing core forwards resource requests, which are directed to the plurality of resources and which the particular processing core receives, to the set of resources that are assigned to the particular processing core based on the uniform assignment list.

11. The non-transitory machine readable medium of claim 10, wherein at least one of (1) a resource in the plurality of resources and (2) a processing core in the plurality of processing cores was previously the subject of an assignment based on a previously generated assignment pattern.

12. The non-transitory machine readable medium of claim 10, wherein the stretch factor is equal to the number of processing cores in the plurality of processing cores divided by the greatest common divisor of: the number of processing cores in the plurality of processing cores and a number of resources in the plurality of resources.

13. The non-transitory machine readable medium of claim 10, wherein the repeat factor is user configurable.

14. The non-transitory machine readable medium of claim 10, wherein the plurality of resources includes at least one placeholder resource and the uniform assignment list includes the at least one placeholder resource.

15. The non-transitory machine readable medium of claim 10, wherein different input patterns result in different uniform assignment lists.

16. The non-transitory machine readable medium of claim 15, wherein the uniform assignment list is uniform with respect to the weights associated with the plurality of resources.

17. The non-transitory machine readable medium of claim 10, wherein, after selecting the resource for processing the request, the particular processing core updates a counter associated with the resource selected.

18. The non-transitory machine readable medium of claim 17, wherein the assignment of the sets of resources reduces the number of processing cores in the plurality of processing cores that update counters associated with each resource in the plurality of resources.

* * * * *